United States Patent
Okagawa et al.

(10) Patent No.: US 10,688,835 B2
(45) Date of Patent: Jun. 23, 2020

(54) RUN-FLAT TIRE

(71) Applicant: Sumitomo Rubber Industries, Ltd., Kobe-shi, Hyogo (JP)

(72) Inventors: Hiroshi Okagawa, Kobe (JP); Kosuke Nakano, Kobe (JP); Tomoyuki Kujime, Kobe (JP); Naoki Sugiyama, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 563 days.

(21) Appl. No.: 15/298,939

(22) Filed: Oct. 20, 2016

(65) Prior Publication Data

US 2017/0129292 A1 May 11, 2017

(30) Foreign Application Priority Data

Nov. 11, 2015 (JP) ................. 2015-221612

(51) Int. Cl.
*B60C 15/04* (2006.01)
*B60C 15/06* (2006.01)
(Continued)

(52) U.S. Cl.
CPC .......... *B60C 17/06* (2013.01); *B60C 15/0018* (2013.01); *B60C 15/0206* (2013.01);
(Continued)

(58) Field of Classification Search
CPC . B60C 15/0018; B60C 15/0603; B60C 15/05; B60C 15/0607; B60C 2015/0696;
(Continued)

(56) References Cited

U.S. PATENT DOCUMENTS

2001/0001971 A1* 5/2001 Cottrell ............... B60C 15/0018
152/516
2003/0116250 A1* 6/2003 Minami ................. B60C 15/06
152/458
(Continued)

FOREIGN PATENT DOCUMENTS

JP          2012-126299 A     7/2012
JP          2014-31147 A      2/2014
(Continued)

*Primary Examiner* — Kendra Ly
(74) *Attorney, Agent, or Firm* — Birch, Stewart, Kolasch & Birch, LLP

(57) ABSTRACT

A run-flat tire comprises a tread portion, sidewall portions, bead portions, and a carcass ply extending between the bead portions. The sidewall portions are each provided therein with a sidewall reinforcing rubber layer having a crescent-shaped cross sectional shape and disposed on the axially inside of the carcass ply. The sidewall portions are each provided in the axially outer surface thereof with a rim protector which projects radially outward most on the radially outside of the radially inner edge of the sidewall reinforcing rubber layer. The bead portions are each provided therein with an axially inside core and an axially outside core between which each radially inner edge portion of the carcass ply is secured. When measured along a normal line drawn normally to the carcass ply from an apex of the rim protector, the thickness of the sidewall reinforcing rubber layer is in a range of from 29% to 35% of the thickness of the tire.

20 Claims, 3 Drawing Sheets

(51) Int. Cl.
  *B60C 17/04* (2006.01)
  *B60C 17/06* (2006.01)
  *B60C 15/00* (2006.01)
  *B60C 17/00* (2006.01)
  *B60C 15/05* (2006.01)
  *B60C 15/02* (2006.01)

(52) U.S. Cl.
  CPC .......... *B60C 15/05* (2013.01); *B60C 15/0607* (2013.01); *B60C 17/0009* (2013.01); *B60C 2015/046* (2013.01); *B60C 2015/061* (2013.01); *B60C 2017/0054* (2013.01); *B60C 2017/0063* (2013.01); *B60C 2017/0072* (2013.01); *B60C 2200/04* (2013.01)

(58) Field of Classification Search
  CPC ........ B60C 2015/061; B60C 2015/048; B60C 17/0009; B60C 17/0018; B60C 17/0027; B60C 17/0036; B60C 2017/0072; B60C 15/0242
  USPC .................................. 152/539–547, 516–522
  See application file for complete search history.

(56) References Cited

U.S. PATENT DOCUMENTS

| | | | |
|---|---|---|---|
| 2014/0034205 A1* | 2/2014 | Yukawa .............. | B60C 17/0009 152/510 |
| 2014/0083591 A1* | 3/2014 | Ito ......................... | B60C 15/04 152/541 |
| 2015/0210123 A1* | 7/2015 | Sugiyama .............. | B29D 30/12 152/517 |

FOREIGN PATENT DOCUMENTS

| | | | | |
|---|---|---|---|---|
| JP | 2014-051234 A | 3/2014 | | |
| WO | WO-2014030424 A1 * | 2/2014 | ............ | B29D 30/12 |
| WO | WO 2015/166805 A1 | 11/2015 | | |

\* cited by examiner

RUN-FLAT TIRE

BACKGROUND OF THE INVENTION

The present invention relates to a pneumatic tire, more particularly to a run-flat tire capable of running for a relatively long distance at a certain speed.

Japanese Patent Application Publication No. 2014-031147 (Patent document 1) discloses a run-flat tire, wherein each sidewall portion is provided with a sidewall reinforcing rubber layer having a crescent-shaped cross sectional shape and disposed on the axially inside of the carcass. Further, a lower portion of each sidewall portion is provided on the outer surface thereof with an axially outwardly protruding rim protector. Such rim protector helps to reduce deformation of the sidewall portion in a run-flat condition.

Japanese Patent Application Publication No. 2012-126299 (Patent document 2) discloses a pneumatic tire, wherein a carcass ply extending between bead portions are not turned up in the bead portions, and, in each bead portion, the edge of the carcass ply is secured between axially inside and outside layers of wires.

SUMMARY OF THE INVENTION

In the pneumatic tire of the patent document 2, the carcass ply is shifted toward the axially outside in the bead portions in comparison with the carcass ply of the patent document 1. Therefore, if the carcass ply and the bead core of the Patent document 2 are merely applied to the run-flat tire of the Patent document 1, the sidewall reinforcing rubber layer disposed on the axially inside of the carcass ply needs to change its dimensions. As a result, it becomes difficult to achieve both the run-flat durability and the ride comfort.

The present inventors therefore, studied and found that it is possible to achieve both the run-flat durability and the ride comfort by limiting the thickness of the sidewall reinforcing rubber layer within a certain range in relation to the thickness of the tire when measured along a normal line drawn normally to the carcass ply from the rim protector's apex.

It is therefore, an object of the present invention to provide a run-flat tire in which both the run-flat durability and the ride comfort can be achieved.

According to the present invention, a run-flat tire comprises a tread portion, a pair of sidewall portions, a pair of bead portions, and a carcass ply extending between the bead portions through the tread portion and the sidewall portions, wherein each of the sidewall portions is provided therein with a sidewall reinforcing rubber layer having a crescent-shaped cross sectional shape and disposed on the axially inside of the carcass ply, each of the sidewall portions is provided in the axially outer surface thereof with a rim protector which projects radially outward most on the radially outside of the radially inner edge of the sidewall reinforcing rubber layer, each of the bead portions is provided therein with an axially inside core and an axially outside core between which each radial inner edge portion of the carcass ply is secured, and when measured along a normal line drawn normally to the carcass ply from an apex of the rim protector, the thickness of the sidewall reinforcing rubber layer is in a range of from 29% to 35% of the thickness of the tire.

Therefore, in the run-flat tire according to the present invention, the carcass ply is shifted toward the axially outside in comparison with a conventional carcass ply which is turned up around a bead core from the axially inside to the axially outside. And the thickness from the carcass ply to the outer surface of the tire is reduced. As a result, the thickness of the sidewall reinforcing rubber layer relative to the tire thickness can be increased to improve the run-flat durability. Further, as the thickness of the sidewall reinforcing rubber layer is 29% to 35% of the tire thickness when measured along the normal line drawn from the rim protector's apex, an increase in the vertical spring constant of the tire during normal running can be prevented while maintaining the bending rigidity of the lower sidewall portion under run-flat condition. Thus, the run-flat tire can achieve both the run-flat durability and the ride comfort.

The run-flat tire according the present invention may further include the following features (1)-(7):

(1) when measured along a normal line drawn normally to the carcass ply from a maximum tire section width point, the thickness of the sidewall reinforcing rubber layer is in a range of from 54% to 62% of the thickness of the tire;

(2) each of the bead portions is provided therein with an axially inside bead apex rubber extending radially outwardly from the axially inside core to a radial height Hi, and an axially outside bead apex rubber extending radially outwardly from the axially outside core to a radial height Ho which is 120% to 150% the radial height Hi of the inside bead apex rubber;

(3) the apex of the rim protector is positioned radially inside the radially outer edge of the outside bead apex rubber;

(4) the complex elastic modulus of the sidewall reinforcing rubber layer is in a range of from 9 to 14 MPa;

(5) the complex elastic modulus of the rim protector excluding a sidewall rubber is in a range of from 8 to 12 MPa;

(6) a sidewall rubber which forms a part of the outer surface of the tire in the sidewall portion, covers a radially outer part of the axially outer surface of a bead clinch rubber, and
the complex elastic modulus of the sidewall rubber is in a range of from 4 to 6 MPa;

(7) the complex elastic modulus of the inside bead apex rubber and the complex elastic modulus of the outside bead apex rubber are in a range of from 50 to 70 MPa.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure is the maximum air pressure for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, the standard pressure is uniformly defined by 180 kPa.

DESCRIPTION OF THE PREFERRED EMBODIMENTS

Figure 1:
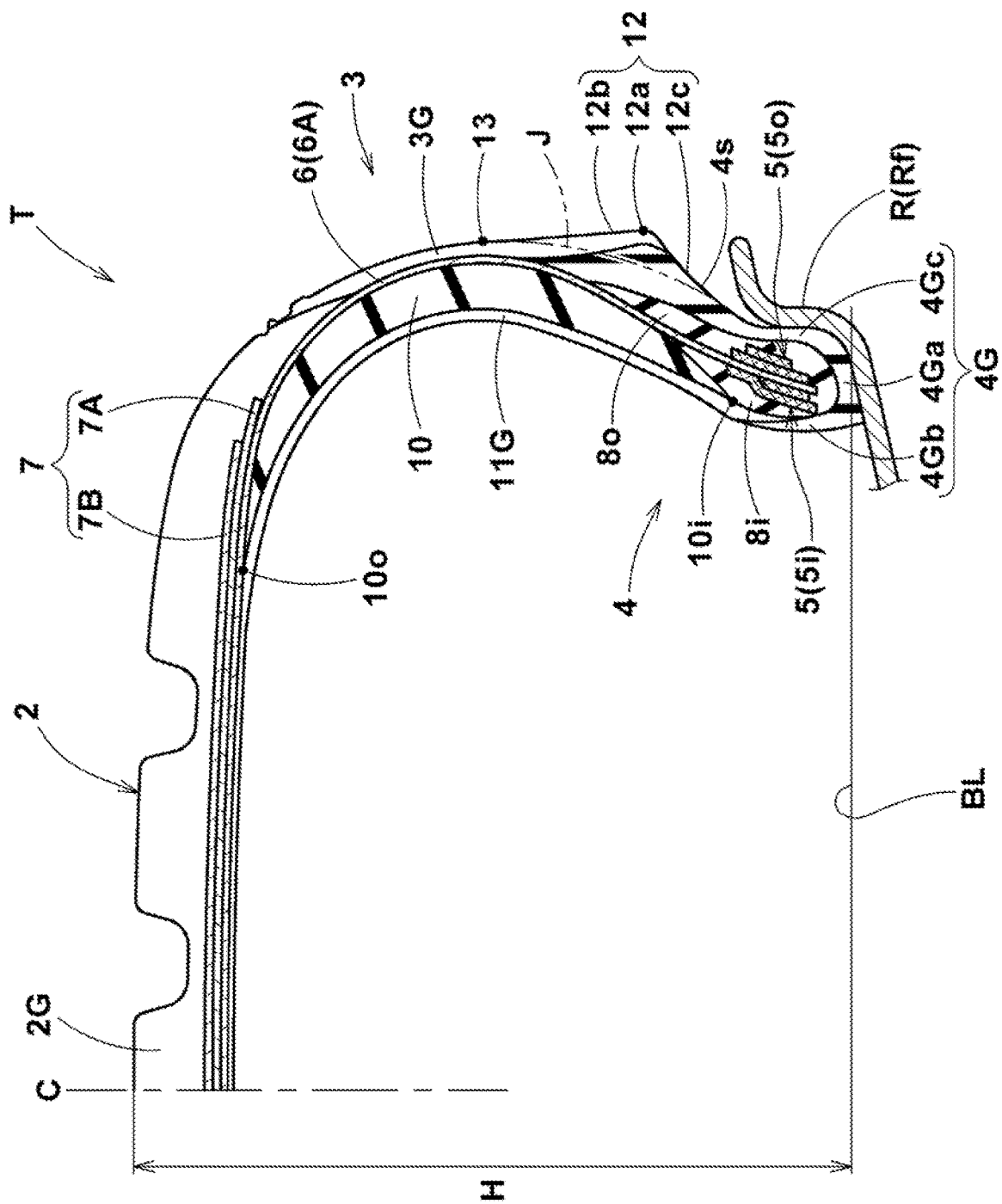
FIG. 1 is a cross sectional partial view of a pneumatic tire as an embodiment of the present invention.

Embodiments of the present invention will now be described in detail in conjunction with the accompanying drawings.

In the drawings, a run-flat tire T according to the present invention comprises a tread portion 2, a pair of axially spaced bead portions 4 each with a bead core 5 therein, a pair of sidewall portions 3 each with a sidewall reinforcing rubber layer 10 therein, a carcass 6 extending between the bead portions 4 through the tread portion 2 and the side portions 3, and a tread reinforcement disposed radially outside the carcass 6 in the tread portion 2.

The carcass 6 is composed of at least one ply, in this embodiment only one ply 6A of cords arranged at an angle of from 75 to 90 degrees with respect to the tire equator C and extending between the bead portions 4 through the tread portion 2 and the sidewall portions 3.

As to the cords of the carcass ply 6A, for example, organic fiber cords, e.g. aromatic polyamide, rayon and the like can be used.

The tread reinforcement comprises a belt 7 composed of at least two cross plies 7A and 7B of cords laid at angles of 15 to 40 degrees with respect to the tire equator C.

As to the cords of the belt, high modulus cords, e.g. steel, aramid, rayon and the like can be used.

Further, the tread reinforcement may comprise a band made of at least one spirally wound cord disposed on the radially outside of the belt 7.

On the radially outside of the tread reinforcement, a tread rubber 2G defining the outer surface of the tread portion 2 is disposed.

In each of the sidewall portions 3, as shown in FIG. 1, a sidewall rubber 3G is disposed axially outside the carcass ply 6A. The sidewall rubber 3G defines a major part of the outer surface of the sidewall portion 3 and abuts on the axially outer surface of the carcass 6 in a region extending radially outwardly and inwardly from the maximum section width position of the carcass.

On the inside of the carcass ply 6A, an inner liner 11G is disposed. The inner liner 11G is made of an air-impermeable rubber compound, and extends along the inner surface of the carcass 6 in the tread portion and the inner surface of the sidewall reinforcing rubber layer 10 in each sidewall portion 3 so as to cover the almost entire area of the inner surface of the tire.

Figure 2:
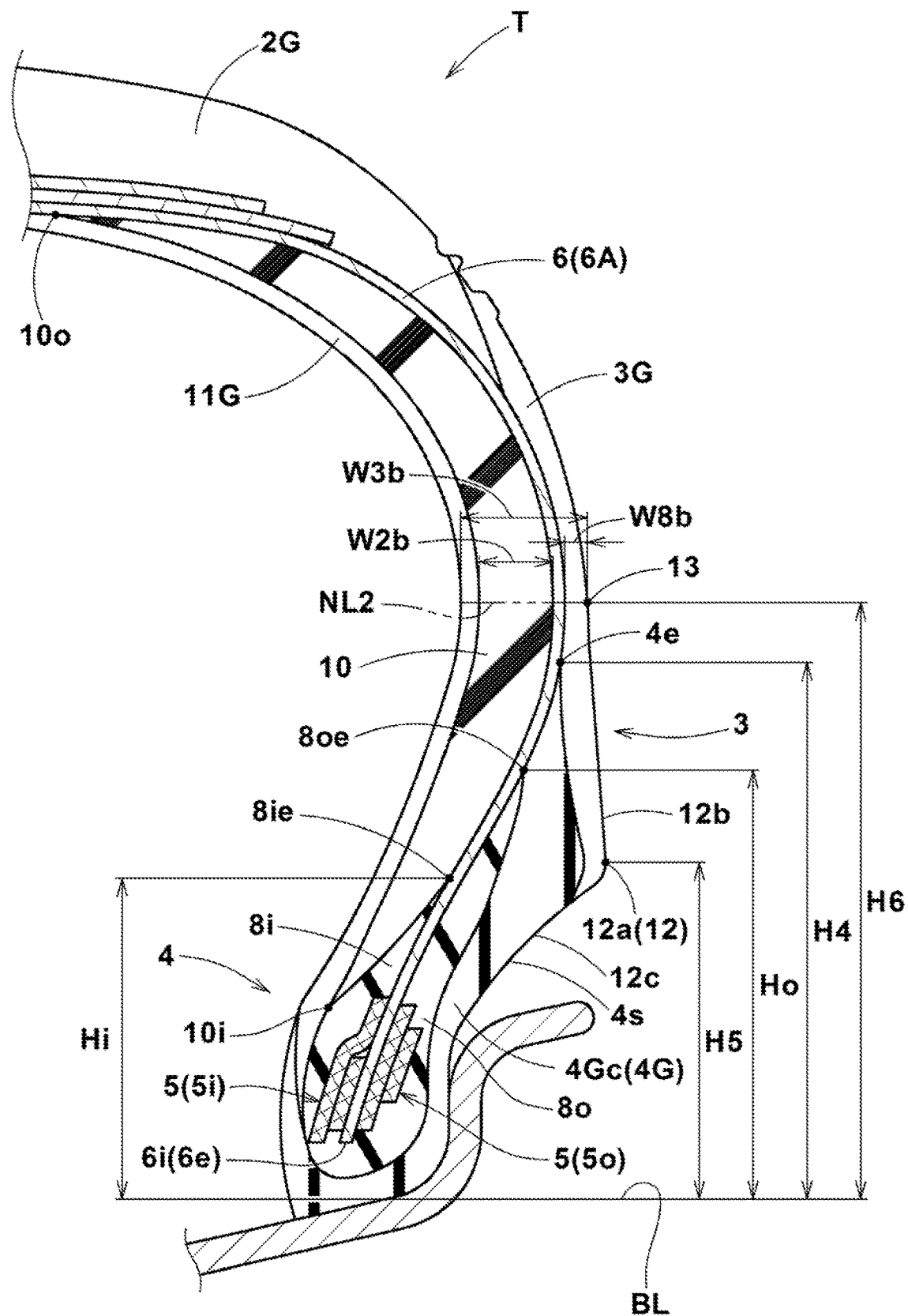
FIG. 2 is an enlarged cross sectional view showing the sidewall portion and the bead portion thereof.

The bead core 5 in each bead portion 4 is, as shown in FIG. 2, made up of an axially inside core 5i and an axially outside core 5o.

The inside core 5i and the outside core 5o are each formed by circumferentially winding a non-extensible bead wire (not shown) plural times around the tire rotational axis.

The radially inner edges 6i of the carcass ply 6A terminate in the respective bead portions 4 without being turned up around the bead cores 5 as shown in FIG. 2.

In each bead portion 4, a radially inner edge portion 6e of the carcass ply 6A is secured between the axially inside core 5i and the axially outside core 5o.

As a result, in a region from a lower sidewall portion 3 to the bead portion 4, the carcass ply 6A is shifted toward the axially outside in comparison with a conventional carcass ply which is turned up around a bead core from the axially inside to the axially outside. And the thickness W1 (shown in FIG. 3) from the carcass ply 6A to the outer surface Ts of the tire is reduced. As a result, an increase of the vertical spring constant of the run-flat tire T in a normal state, which deteriorates the ride comfort during normal running, can be prevented. Namely, the ride comfort can be improved.

As shown in FIG. 1, in each of the bead portions 4, there are disposed an axially outside bead apex rubber 8o, an axially inside bead apex rubber 8i, and a bead clinch rubber 4G.

The axially inside bead apex rubber 8i extends toward the radially outside from the inside core 5i while tapering to the radially outer edge 8ie thereof.

In this embodiment, the inside bead apex rubber 8i extends radially outwardly, abutting on the axially inner surface of the inside core 5i and then abutting on the axially inner surface of the carcass ply 6A.

The axially outside bead apex rubber 8o extends toward the radially outside from the outside core 5o, and a radially outer edge portion thereof is tapered to the radially outer edge 8oe.

In this embodiment, the axially outside bead apex rubber 8o extends radially outwardly, abutting on the axially outer surface of the outside core 5o and then abutting on the axially outer surface of the carcass ply 6A.

Preferably, the radial height Ho of the outside bead apex rubber 8o is more than the radial height Hi of the inside bead apex rubber 8i, each measured from the bead base line BL.

As explained above, the radially outer edge 8ie of the axially inside bead apex rubber 8i and the radially outer edge 8oe of the axially outside bead apex rubber 8o are spaced apart from each other in the tire radial direction. Therefore, a stress concentration on the edges 8ie and 8oe can be prevented. Further, the axially inside bead apex rubber 8i from which heat release is difficult in comparison with the axially outside bead apex rubber 8o can be decreased in the volume, and thereby the heat generation from the axially inside bead apex rubber 8i is reduced. Thus, the durability of the bead portion 4 can be improved.

In order to effectively derive such functions, the radial height Ho of the outside bead apex rubber 8o is preferably set in a range of not less than 120%, more preferably not less than 125%, but not more than 150%, more preferably not more than 145% of the radial height Hi of the inside bead apex rubber 8i.

If the radial height Ho is less than 120% of the radial height Hi, there is a possibility that a stress concentration occurs, and it becomes difficult to improve the durability of the bead portion 4.

If the radial height Ho is more than 150% of the radial height Hi, there is a possibility that the heat generation from the axially outside bead apex rubber 8o is increased, and it becomes difficult to improve the durability of the bead portion 4.

In order to derive such functions more effectively, the complex elastic modulus E* of the inside bead apex rubber 8$i$ may differ from the complex elastic modulus E* of the outside bead apex rubber 8$o$.

For example, in order to increase the rigidity of the bead portion 4 on the side of the rim flange Rf, the outside bead apex rubber 8$o$ may be set to a higher complex elastic modulus E* than that of the inside bead apex rubber 8$i$.

In this application, the complex elastic modulus E* refers to a tensile complex elastic modulus E measured according to Japanese Industrial standard K6394 under the following conditions:
 temperature: 70 deg. C.
 frequency: 10 Hz
 initial elongation: 10%
 dynamic strain: −2% to +2%

The bead clinch rubber 4G extends along the bottom surface, axially inner surface and axially outer surface of the bead portion 4 to define the outer surface 4$s$ of the bead portion 4. Thus, the bead clinch rubber 4G is made up of a base portion 4Ga, an axially inside portion 4Gb, and an axially outside portion 4Gc to have a J-shaped cross section as shown in FIG. 1.

The base portion 4Ga is positioned radially inside the bead apex rubber 8$i$ and bead apex rubber 8$o$ and extends between the bead heel and bead toe to define the bead bottom surface.

The axially inside portion 4Gb extends radially outwardly from the base portion 4Ga along the axially inner surface of the inside bead apex rubber 8$i$ and then the axially inner surface of the radially inner edge portion of the inner liner 11G.

The axially inside portion 4Gb tapers and terminates on the axially inner surface of the inner liner 11G.

The axially outside portion 4Gc extends radially outwardly from the base portion 4Ga along the axially outer surface of the axially outside bead apex rubber 8$o$, defining the axially outer surface of the bead portion 4.

The radial height H4 of the radially outer edge 4$e$ of the axially outside portion 4Gc from bead base line BL is set to be more than the radial height Ho of the radially outer edge 8$oe$ of the axially outside bead apex rubber 8$o$ in order to avoid a stress concentration.

The radially outer edge 4$e$ of the axially outside portion 4Gc is covered with the sidewall rubber 3G.

The thickness of the axially outside portion 4Gc is gradually increased toward the radially outside from a separating point from which the axially outer surface of the bead portion separates from the rim flange, and then gradually decreased from a certain radial height at which the thickness is maximum to the radially outer edge 4$e$.

In this embodiment, the sidewall rubber 3G extends radially inwardly beyond the above-mentioned radial height at which the thickness of the axially outside portion 4Gc is maximum.

The run-flat tire T is provided on each sidewall portion 3 with a rim protector 12 projecting axially outward most on the radially outside of the radially inner edge 10$i$ of the sidewall reinforcing rubber layer 10 as shown in FIG. 1.

The rim protector 12 has an apex 12$a$, a radially outer inclined surface 12$b$, and a radially inner inclined surface 12$c$ and has a triangular cross sectional shape.

The rim protector 12 is formed continuously in the tire circumferential direction by the sidewall rubber 3G and the axially outside portion 4Gc of the bead clinch rubber 4G. The above-mentioned radial height at which the thickness of the axially outside portion 4Gc is maximum, is substantially equal to the radial height H5 of the apex 12$a$.

The apex 12$a$ of the rim protector 12 is the axially outermost point, but, if the axially outermost point has a certain radial extent, the midpoint of the radial extent is used.

The apex 12$a$ is positioned axially outside the axially outermost point of the rim flange Rf. Further, the apex 12$a$ is positioned radially outside the radially inner edge 10$i$ of the sidewall reinforcing rubber layer 10, and radially inside the radially outer edge 8$oe$ of the axially outside bead apex rubber 8$o$.

Figure 3:
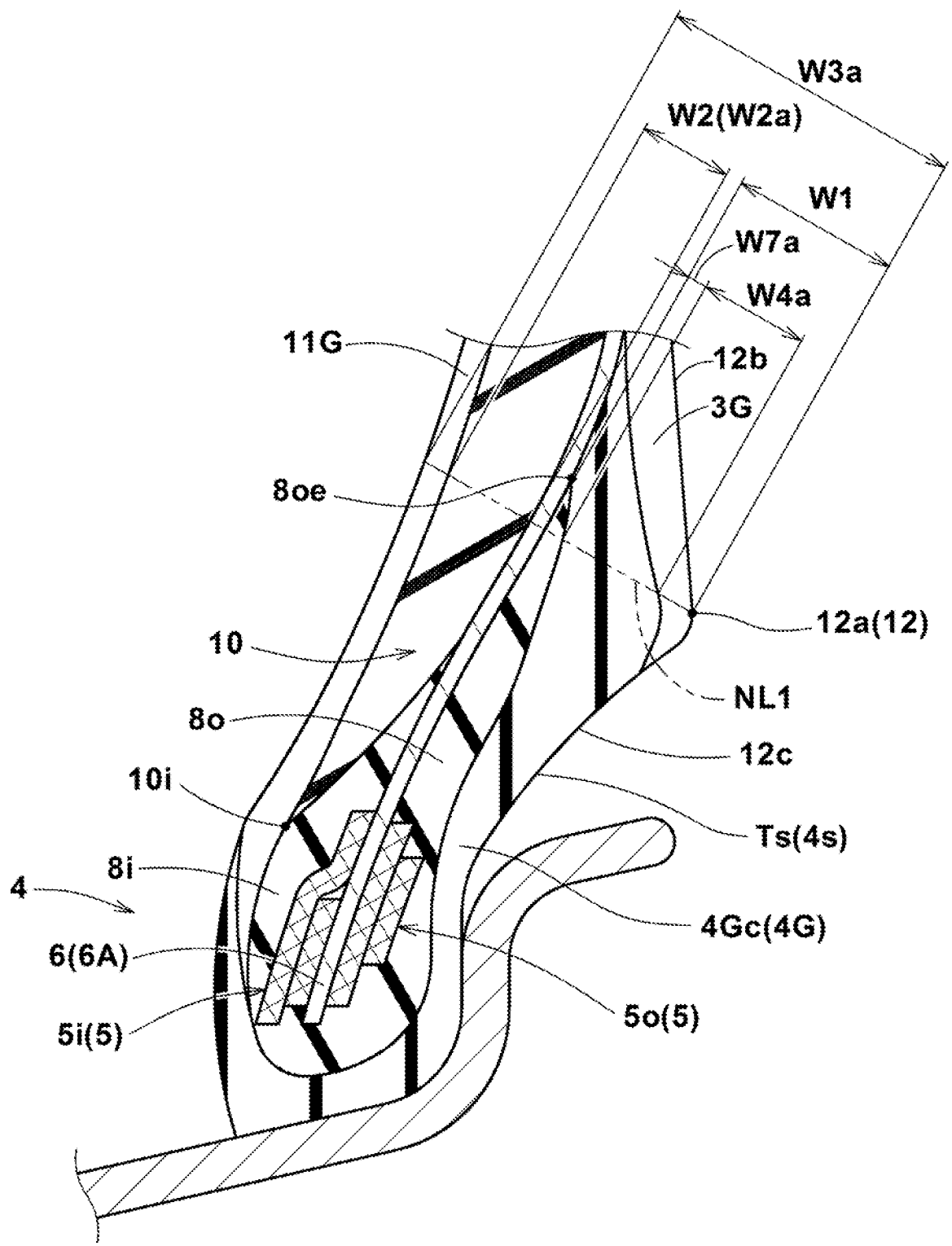
FIG. 3 is an enlarged cross sectional view showing the bead portion thereof.

In a run-flat condition, the strain of the lower sidewall portion and bead portion becomes maximum in the vicinity of a normal line NL1 which is drawn normally to the carcass ply 6A from the apex 12$a$ (or the above-mentioned midpoint of the radial extent) as shown in FIG. 3.

Therefore, the radially inner edge 10$i$ of the sidewall reinforcing rubber layer 10 and the radially outer edge 8$oe$ of the axially outside bead apex rubber 8$o$ are disposed away from the normal line NL1 to prevent stress concentration thereon.

As shown in FIG. 2, the radial height H5 of the apex 12$a$ from the bead base line BL is set in a range of from 50% to 70% of the radial height H6 from the bead base line BL of the maximum tire section width point 13 corresponding to the maximum section width position of the carcass.

The radial height H6 is set in a range of from 42% to 52% of the tire section height H from the bead base line BL.

The above-mentioned radially outer inclined surface 12$b$ extends from the apex 12$a$ to the maximum tire section width point 13. The radially outer inclined surface 12$b$ is formed by the sidewall rubber 3G.

The radially inner inclined surface 12$c$ extends from the apex 12$a$ to the bead portion 4. The radially inner inclined surface 12$c$ is formed by the sidewall rubber 3G (near the apex 12$a$) and the bead clinch rubber 4G.

In a run-flat condition, the radially inner inclined surface 12$c$ leans over on the rim flange Rf and contacts therewith. Thereby, deflection of the run-flat tire T in a run-flat condition can be reduced.

The sidewall reinforcing rubber layer 10 is disposed on the axially inside of the carcass 6 in each sidewall portion as shown in FIG. 1 in order to increase the bending rigidity of the sidewall portion 3.

The sidewall reinforcing rubber layer 10 is curved along the carcass, and the thickness thereof is gradually decreased from its midpoint in the tire radial direction toward the radially inner edge 10$i$ and toward the radially outer edge 10$o$.

Thus, the sidewall reinforcing rubber layer 10 has a crescent shape.

The radially outer edge 10$o$ of the sidewall reinforcing rubber layer 10 is positioned in the tread portion 2 under the tread reinforcement (belt 7).

In a region of the run-flat tire T from the lower sidewall portion to the bead portion 4, as the carcass ply 6A is shifted toward the axially outside, the thickness W2 of the sidewall reinforcing rubber layer 10 is increased in comparison with those in the conventional run-flat tires (not shown). Thereby, the bending rigidity of the sidewall reinforcing rubber layer 10 is increased, and the run-flat tire T can be improved in the run-flat durability.

As shown in FIG. 3, when measured along the normal line NL1, the thickness W2$a$ of the sidewall reinforcing rubber layer 10 is set in a range of not less than 31%, preferably not less than 31%, but not more than 3%, preferably not more than 33% of the tire thickness W3a.

As explained above, under a run-flat condition, the strain of the lower sidewall portion and bead portion becomes maximum in the vicinity of a normal line NL1.

But, as the percentage of the thickness W2a with respect to the tire thickness W3a is set to higher values than those in the conventional run-flat tires (not shown), the lower sidewall portion and the bead portion 4 are increased in the bending rigidity, and deformation under a run-flat condition can be reduced. And as the percentage is limited to at most 35, an increase of the vertical spring constant of the run-flat tire T in a normal state which deteriorates the ride comfort during normal running, can be prevented. Thus, the run-flat tire T can achieve both the run-flat durability and ride comfort.

If the thickness W2a is less than 29% of the tire thickness W3a, there is a possibility that the sidewall reinforcing rubber layer 10 can not maintain its bending rigidity required under a run-flat condition.

If the thickness W2a is more than 35% of the tire thickness W3a, there is a possibility that the vertical spring constant of the run-flat tire T during normal running is increased and the ride comfort is deteriorated.

In order to achieve the run-flat durability and ride comfort at high levels, preferably, the complex elastic modulus E* of the sidewall reinforcing rubber layer 10 is set in a range of not less than 9 MPa, preferably not less than 11 MPa, but not more than 14 MPa, preferably not more than 13 MPa.

If less than 9 MPa, there is a possibility that the rigidity of the sidewall reinforcing rubber layer 10 becomes insufficient, and the sidewall reinforcing rubber layer 10 can not maintain its bending rigidity required in a run-flat condition.

If more the 14 MPa, there is a possibility that the rigidity of the sidewall reinforcing rubber layer 10 becomes high, and the vertical spring constant of the run-flat tire T during normal running is increased to deteriorate the ride comfort.

The bead clinch rubber 4G extent across the normal line NL1 to form a part of the rim protector 12.

When measured along the normal line NL1, the thickness W4a of the bead clinch rubber 4G is preferably set in a range of not less than 35% but not more than 42% of the tire thickness W3a in order to achieve the run-flat durability and the ride comfort at high levels.

Further, the complex elastic modulus E* of the bead clinch rubber 4G which constitutes a major part of the rim protector 12 is preferably set in a range of not less than 8 MPa, preferably not less than 9 MPa, but not more than 12 MPa, preferably not more than 11 MPa.

If less than 8 MPa, there is a possibility that the vertical deflection of the tire when punctured can not be effectively reduced. If more than 12 MPa, there is a possibility that the vertical spring constant of the run-flat tire T during normal running is increased and the ride comfort is deteriorated.

The axially outside bead apex rubber 8o extends across the normal line NL1. When measured along the normal line NL1, the thickness W7a of the axially outside bead apex rubber 8o is preferably set in a range of not less than 5%, but not more than 12% of the tire thickness W3a in order to achieve the run-flat durability and the ride comfort at high levels.

Further, the complex elastic modulus E* of the axially outside bead apex rubber 8o is preferably set in a range of not less than 50 MPa, more preferably not less than 55 MPa, but not more than 70 MPa, more preferably not more than 65 MPa.

In order to reduce the deflection of the tire in a run-flat condition by increasing the rigidity of the bead portion 4 in cooperation with the sidewall reinforcing rubber layer 10, it is preferred that the complex elastic modulus E* of the axially inside bead apex rubber 8i is set in the same range as that for the complex elastic modulus E* of the axially outside bead apex rubber 8o.

If the heat generation from the axially inside bead apex rubber 8i and axially outside bead apex rubber 8o in a run-flat condition is large, the run-flat durability is deteriorated. Therefore, in order to lessen the heat generation from the axially inside bead apex rubber 8i and the axially outside bead apex rubber 8o without sacrificing their rigidity, the loss tangent (tan δ) of the axially inside bead apex rubber 8i and the loss tangent (tan δ) of the axially outside bead apex rubber 8o are preferably set in a range not more than 0.10, preferably not more than 0.12, but not less than 0.13, preferably not less than 0.11.

If the loss tangent (tan δ) is more than 0.13, there is a possibility that the heat generation from each bead apex rubber 8i, 8o can not be effectively decreased.

If the loss tangent (tan δ) is less than 0.10, there is a possibility that each bead apex rubber 8i, 8o can not maintain its rigidity at required levels.

The loss tangent (tan δ) is measured by the same method as in the complex elastic modulus E*.

The sidewall reinforcing rubber layer 10 is increased in the thickness W2a measured along the normal line NL1.

According thereto, the thickness W2b of the sidewall reinforcing rubber layer 10 measured along a normal line NL2 drawn normally to the carcass ply 6A from the maximum tire section width point 13 as shown in FIG. 2 is decreased in comparison with that in the conventional run-flat tire (not shown). Thereby, the run-flat tire T can be reduced in the vertical spring constant during normal running to improve the ride comfort.

In order to effectively derive such functions, it is preferable that, when measured along the normal line NL2, the thickness W2b of the sidewall reinforcing rubber layer 10 is not less than 54%, preferably not more than 60%, but not more than 62%, preferably not less than 56% of the tire thickness W3b. If more than 62%, there is a possibility that the vertical spring constant during normal running can not be effectively decreased to improve the ride comfort.

If less than 54%, there is a possibility that the sidewall reinforcing rubber layer 10 can not maintain its bending rigidity required in a run-flat condition.

The sidewall rubber 3G extends across the normal line NL2. When measured along the normal line NL2, the thickness W8b of the sidewall rubber 3G is preferably set in a range of from 18% to 26% of the tire thickness W3b in order to achieve the run-flat durability and the ride comfort at high levels. Further, the complex elastic modulus E* of the sidewall rubber 3G is preferably set in a range of from 4 to 6 MPa.

If more than 6 MPa, there is a possibility that the vertical spring constant of the run-flat tire T during normal running is increased and the ride comfort is deteriorated. If less than 4 MPa, there is a possibility that the vertical deflection of the tire when punctured can not be reduced.

Comparison Tests

Based on the structure shown in FIG. 1, run-flat tires were experimentally manufactured and tested for the run-the flat durability and the ride comfort. Common specifications are as follows. Other specifications are listed in Table 1.
tire size: 245/45RF18
rim size: 18×8.0 J height H4 of axially outside portion of bead clinch rubber: 50 mm
height H6 of maximum tire section width point: 50.5 mm
tire section height H: 108 mm
tire thickness W3$a$ along normal line NL1: 20 mm
tire thickness W3$b$ along normal line NL2: 13 mm
height Hi of inside bead apex rubber 8$i$: 30 mm <Run-Flat Durability Test>

Using a tire test drum having a diameter of 1.7 meters, the running distance of each tire until an abnormal sound was generated was measured at a speed of 80 km/h, a tire load of 4.53 kN, a tire pressure of 0 kPa.

The test results are indicated in Table 1, wherein more than 100 km is satisfactory as the run-flat durability.

<Ride Comfort Test>

Using a 3500 cc FR passenger car provided on all wheels with test tires (tire pressure 210 kPa), a test driver evaluated the ride comfort based on the motion of the sprung car body, rigid feeling, harshness and the like during running on a dry asphalt road surface of a test course.

The results are indicated by an index based on working example Ex.1 being 100, wherein the larger the value, the better the ride comfort, and more than 90 is satisfactory.

From the test results, it was confirmed that, in comparison with comparative examples, working examples could achieve the run-flat durability and the ride comfort.

TABLE 1

| Tire | Ref. 1 | Ref. 2 | Ex. 1 | Ex. 2 | Ex. 3 | Ex. 4 | Ref. 3 | Ref. 4 | Ex. 5 | Ex. 6 | Ex. 7 |
|---|---|---|---|---|---|---|---|---|---|---|---|
| thickness W2$a$/thickness W3$a$ (%) | 25.0 | 28.0 | 29.0 | 30.0 | 33.0 | 35.0 | 36.0 | 38.0 | 30.0 | 30.0 | 30.0 |
| thickness W2$b$/thickness W3$b$ (%) | 56.0 | 52.0 | 54.0 | 56.0 | 60.0 | 62.0 | 64.0 | 68.0 | 56.0 | 56.0 | 56.0 |
| height Ho/height Hi (%) | 130.0 | 130.0 | 130.0 | 130.0 | 130.0 | 130.0 | 130.0 | 130.0 | 110.0 | 120.0 | 150.0 |
| complex elastic modulus E* (MPa) | | | | | | | | | | | |
| sidewall reinforcing rubber layer | 11.5 | 11.5 | 11.5 | 11.5 | 11.5 | 11.5 | 11.5 | 11.5 | 11.5 | 11.5 | 11.5 |
| bead clinch rubber | 10.0 | 10.0 | 10.0 | 10.0 | 10.0 | 10.0 | 10.0 | 10.0 | 10.0 | 10.0 | 10.0 |
| sidewall rubber | 4.8 | 4.8 | 4.8 | 4.8 | 4.8 | 4.8 | 4.8 | 4.8 | 4.8 | 4.8 | 4.8 |
| inside and outside bead apex rubbers | 60.0 | 60.0 | 60.0 | 60.0 | 60.0 | 60.0 | 60.0 | 60.0 | 60.0 | 60.0 | 60.0 |
| tan δ of inside and outside bead apex rubbers | 0.160 | 0.160 | 0.160 | 0.160 | 0.160 | 0.160 | 0.160 | 0.160 | 0.160 | 0.160 | 0.160 |
| height H5/height Ho (%) | 75.0 | 75.0 | 75.0 | 75.0 | 75.0 | 75.0 | 75.0 | 75.0 | 75.0 | 75.0 | 75.0 |
| run-flat durability (km) | 23 | 67 | 105 | 110 | 154 | 178 | 198 | 241 | 101 | 108 | 115 |
| ride comfort | 100 | 110 | 105 | 100 | 95 | 90 | 85 | 75 | 102 | 101 | 98 |

| Tire | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|
| thickness W2$a$/thickness W3$a$ (%) | 30.0 | 30.0 | 30.0 | 30.0 | 30.0 | 30.0 | 30.0 | 30.0 | 30.0 | 30.0 | 30.0 |
| thickness W2$b$/thickness W3$b$ (%) | 56.0 | 56.0 | 56.0 | 56.0 | 56.0 | 56.0 | 56.0 | 56.0 | 56.0 | 56.0 | 56.0 |
| height Ho/height Hi (%) | 160.0 | 130.0 | 130.0 | 130.0 | 130.0 | 130.0 | 130.0 | 130.0 | 130.0 | 130.0 | 130.0 |
| complex elastic modulus E* (MPa) | | | | | | | | | | | |
| sidewall reinforcing rubber layer | 11.5 | 8.0 | 9.0 | 14.0 | 15.0 | 11.5 | 11.5 | 11.5 | 11.5 | 11.5 | 11.5 |
| bead clinch rubber | 10.0 | 10.0 | 10.0 | 10.0 | 10.0 | 7.0 | 8.0 | 12.0 | 13.0 | 10.0 | 10.0 |
| sidewall rubber) | 4.8 | 4.8 | 4.8 | 4.8 | 4.8 | 4.8 | 4.8 | 4.8 | 4.8 | 3.5 | 4.0 |
| inside and outside bead apex rubbers | 60.0 | 60.0 | 60.0 | 60.0 | 60.0 | 60.0 | 60.0 | 60.0 | 60.0 | 60.0 | 60.0 |
| tan δ of inside and outside bead apex rubbers | 0.160 | 0.160 | 0.160 | 0.160 | 0.160 | 0.160 | 0.160 | 0.160 | 0.160 | 0.160 | 0.160 |
| height H5/height Ho (%) | 75.0 | 75.0 | 75.0 | 75.0 | 75.0 | 75.0 | 75.0 | 75.0 | 75.0 | 75.0 | 75.0 |
| run-flat durability (km) | 120 | 101 | 108 | 115 | 118 | 102 | 108 | 115 | 120 | 103 | 109 |
| ride comfort | 91 | 103 | 102 | 98 | 93 | 105 | 103 | 98 | 91 | 105 | 101 |

TABLE 1-continued

| Tire | Ex. 19 | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|
| thickness W2a/thickness W3a (%) | 30.0 | 30.0 | 30.0 | 30.0 | 30.0 | 30.0 | 30.0 | 30.0 | 30.0 | 30.0 | 30.0 |
| thickness W2b/thickness W3b (%) | 56.0 | 56.0 | 56.0 | 56.0 | 56.0 | 56.0 | 56.0 | 56.0 | 56.0 | 56.0 | 56.0 |
| height Ho/height Hi (%) | 130.0 | 130.0 | 130.0 | 130.0 | 130.0 | 130.0 | 130.0 | 130.0 | 130.0 | 130.0 | 130.0 |
| complex elastic modulus E* (MPa) | | | | | | | | | | | |
| sidewall reinforcing rubber layer | 11.5 | 11.5 | 11.5 | 11.5 | 11.5 | 11.5 | 11.5 | 11.5 | 11.5 | 11.5 | 11.5 |
| bead clinch rubber | 10.0 | 10.0 | 10.0 | 10.0 | 10.0 | 10.0 | 10.0 | 10.0 | 10.0 | 10.0 | 10.0 |
| sidewall rubber | 6.0 | 6.5 | 4.8 | 4.8 | 4.8 | 4.8 | 4.8 | 4.8 | 4.8 | 4.8 | 4.8 |
| inside and outside bead apex rubbers | 60.0 | 60.0 | 45.0 | 50.0 | 70.0 | 75.0 | 60.0 | 60.0 | 60.0 | 60.0 | 60.0 |
| tan δ of inside and outside bead apex rubbers | 0.160 | 0.160 | 0.160 | 0.160 | 0.160 | 0.160 | 0.095 | 0.100 | 0.130 | 0.135 | 0.160 |
| height H5/height Ho (%) | 75.0 | 75.0 | 75.0 | 75.0 | 75.0 | 75.0 | 75.0 | 75.0 | 75.0 | 75.0 | 100.0 |
| run-flat durability (km) | 115 | 121 | 102 | 109 | 114 | 120 | 140 | 135 | 125 | 115 | 104 |
| ride comfort | 99 | 92 | 105 | 103 | 97 | 93 | 90 | 95 | 100 | 100 | 100 |

The invention claimed is:

1. A run-flat tire comprising
a tread portion,
a pair of sidewall portions,
a pair of bead portions,
a carcass ply extending between the bead portions through the tread portion and the sidewall portions,
a sidewall rubber disposed in each of the sidewall portions so as to form an outer surface of the tire in the sidewall portion, and
a bead clinch rubber disposed in each of the bead portions so as to form an axially outer surface of the bead portion,
wherein
each of the sidewall portions is provided therein with a sidewall reinforcing rubber layer having a crescent-shaped cross sectional shape and disposed on the axially inside of the carcass ply,
each of the sidewall portions is provided in the axially outer surface thereof with a rim protector which projects axially outward most on the radially outside of the radially inner edge of the sidewall reinforcing rubber layer,
the rim protector is made up of a radially inner part of the sidewall rubber and a radially outer part of the bead clinch rubber,
the complex elastic modulus of the sidewall rubber is in a range of from 4 to 6 MPa,
the complex elastic modulus of the rim protector excluding the sidewall rubber is in a range of from 8 to 12 MPa,
each of the bead portions is provided therein with an axially inside core and an axially outside core between which each radially inner edge portion of the carcass ply is secured, and further provided therein with an axially inside bead apex rubber extending radially outwardly from the axially inside core to a radial height Hi, and an axially outside bead apex rubber extending radially outwardly from the axially outside core to a radial height Ho,
in each bead portion, the bead clinch rubber extends along said axially outer surface of the bead portion and a bottom surface and an axially inner surface of the bead portion, abutting on the entire axially outer surface of the axially outside bead apex rubber and a radially inner end portion of the axially inner surface of the axially inside bead apex rubber so as to cover a radially inner end portion of an inner liner extending along the inner surface of the tire,
when measured along a first normal line drawn normally to the carcass ply from an apex of the rim protector, the thickness of the sidewall reinforcing rubber layer is in a range of from 29% to 35% of the thickness of the tire,
when measured along the first normal line, the thickness from the carcass ply to the inner surface of the tire equals to a sum of the thickness of the sidewall reinforcing rubber layer and the thickness of the inner liner, and
in each bead portion, the inner liner extends radially inward beyond the radially inner edge of the sidewall reinforcing rubber layer, and the radially inner end portion of the inner liner is secured between the axially inside bead apex rubber and the bead clinch rubber.

2. The run-flat tire according to claim 1, wherein
when measured along a second normal line drawn normally to the carcass ply from a maximum tire section width point,
the thickness of the sidewall reinforcing rubber layer is in a range of from 54% to 62% of the thickness of the tire.

3. The run-flat tire according to claim 2, wherein
the radial height Ho of the outside bead apex rubber is 120% to 150% the radial height Hi of the inside bead apex rubber.

4. The run-flat tire according to claim 2, wherein
the complex elastic modulus of the sidewall reinforcing rubber layer is in a range of from 9 to 14 MPa.

5. The run-flat tire according to claim 2, wherein
the radially inner part of the sidewall rubber covers the radially outer part of the axially outer surface of the bead clinch rubber.

6. The run-flat tire according to claim 1, wherein
the radial height Ho of the outside bead apex rubber is 120% to 150% the radial height Hi of the inside bead apex rubber.
7. The run-flat tire according to claim 6, wherein
the apex of the rim protector is positioned radially inside the radially outer edge of the outside bead apex rubber.
8. The run-flat tire according to claim 7, wherein
the complex elastic modulus of the sidewall reinforcing rubber layer is in a range of from 9 to 14 MPa.
9. The run-flat tire according to claim 7, wherein
the radially inner part of the sidewall rubber covers the radially outer part of the axially outer surface of the bead clinch rubber.
10. The run-flat tire according to claim 6, wherein
the complex elastic modulus of the inside bead apex rubber and the complex elastic modulus of the outside bead apex rubber are in a range of from 50 to 70 MPa.
11. The run-flat tire according to claim 6, wherein
the complex elastic modulus of the sidewall reinforcing rubber layer is in a range of from 9 to 14 MPa.
12. The run-flat tire according to claim 6, wherein
the radially inner part of the sidewall rubber covers the radially outer part of the axially outer surface of the bead clinch rubber.
13. The run-flat tire according to claim 1, wherein
the complex elastic modulus of the sidewall reinforcing rubber layer is in a range of from 9 to 14 MPa.
14. The run-flat tire according to claim 13, wherein
the radially inner part of the sidewall rubber covers the radially outer part of the axially outer surface of the bead clinch rubber.
15. The run-flat tire according to claim 1, wherein
the radially inner part of the sidewall rubber covers the radially outer part of the axially outer surface of the bead clinch rubber.
16. The run-flat tire according to claim 1, wherein
the thickness of the bead clinch rubber is gradually increased from its radially outer edge toward the apex of the rim protector, and gradually increased from the bead portion toward the apex of the rim protector.
17. The run-flat tire according to claim 16, wherein
the sidewall rubber extends radially inwardly beyond the apex of the rim protector, and then tapers up to its radially inner edge.
18. The run-flat tire according to claim 17, wherein
when measured along the first normal line, the thickness from the carcass ply to the outer surface of the tire equals to a sum of:
the thickness of the sidewall rubber;
the thickness of the bead clinch rubber which is from 35% to 42% of a tire thickness from the outer surface to the inner surface of the tire; and
the thickness of an axially outside bead apex rubber which is from 5% to 12% of the tire thickness,
wherein the complex elastic modulus of the axially outside bead apex rubber is in a range from 50 MPa to 70 MPa.
19. A run-flat tire comprising
a tread portion,
a pair of sidewall portions,
a pair of bead portions,
a carcass ply extending between the bead portions through the tread portion and the sidewall portions,
a sidewall rubber disposed in each of the sidewall portions so as to form an outer surface of the tire in the sidewall portion,
a sidewall reinforcing rubber layer disposed in each of the sidewall portions and having a crescent-shaped cross sectional shape, the sidewall reinforcing rubber layer disposed on the axially inside of the carcass ply,
an inner liner extending along the inner surface of the tire,
an axially inside core and an axially outside core, which are disposed in each of the bead portions, and between which each radially inner edge portion of the carcass ply is secured,
an axially inside bead apex rubber disposed in each of the bead portions, and extending radially outwardly from the axially inside core,
an axially outside bead apex rubber disposed in each of the bead portions, and extending radially outwardly from the axially outside core, and
a bead clinch rubber disposed in each of the bead portions so as to form an axially outer surface of the bead portion, the bead clinch rubber extending along said axially outer surface, a bottom surface and an axially inner surface of the bead portion while abutting on the entire axially outer surface of the axially outside bead apex rubber and a radially inner end portion of the axially inner surface of the axially inside bead apex rubber so as to cover a radially inner end portion of the inner liner,
wherein
each of the sidewall portions is provided in the axially outer surface thereof with a rim protector which projects axially outward most on the radially outside of the radially inner edge of the sidewall reinforcing rubber layer,
said rim protector is made up of a radially inner part of the sidewall rubber and a radially outer part of the bead clinch rubber, wherein said radially inner part of the sidewall rubber extends radially inwardly beyond the apex of the rim protector and then tapers up to its radially inner edge, and the thickness of said radially outer part of the bead clinch rubber is gradually decreased toward the radially inside and outside of the tire from the apex of the rim protector,
when measured along a first normal line drawn normally to the carcass ply from an apex of the rim protector, the thickness from the carcass ply to the inner surface of the tire equals to the sum of:
the thickness of the sidewall reinforcing rubber layer which is in a range of from 29% to 35% of a tire thickness from the outer surface to the inner surface of the tire; and
the thickness of the inner liner,
when measured along the first normal line, the thickness from the carcass ply to the outer surface of the tire equals to the sum of:
the thickness of the sidewall rubber;
the thickness of the bead clinch rubber which is from 35% to 42% of said tire thickness; and
the thickness of the axially outside bead apex rubber which is from 5% to 12% of said tire thickness,
when measured along a second normal line drawn normally to the carcass ply from a maximum tire section width point, the thickness of the sidewall reinforcing rubber layer is in a range of from 54% to 62% of said tire thickness, and
in each bead portion, the inner liner extends radially inward beyond the radially inner edge of the sidewall reinforcing rubber layer, and the radially inner end portion of the inner liner is secured between the axially inside bead apex rubber and the bead clinch rubber.

20. The run-flat tire according to claim 19, wherein
the complex elastic modulus of the sidewall rubber is in a range of from 4 to 6 MPa,
the complex elastic modulus of the sidewall reinforcing rubber layer is in a range of from 9 to 14 MPa,
the complex elastic modulus of the rim protector excluding the sidewall rubber is in a range of from 8 to 12 MPa,
the complex elastic modulus of the axially inside bead apex rubber is in a range from 50 to 70 MPa, and
the complex elastic modulus of the axially outside bead apex rubber is in a range from 50 to 70 MPa.

* * * * *